(12) United States Patent
Mullett

(10) Patent No.: US 6,936,997 B2
(45) Date of Patent: Aug. 30, 2005

(54) METHOD OF FORMING A HIGH EFFICIENCY POWER CONTROLLER

(75) Inventor: Charles E. Mullett, Santa Paula, CA (US)

(73) Assignee: Semiconductor Components Industries, LLC, Phoenix, AZ (US)

( * ) Notice: Subject to any disclaimer, the term of this patent is extended or adjusted under 35 U.S.C. 154(b) by 108 days.

(21) Appl. No.: 10/638,227

(22) Filed: Aug. 11, 2003

(65) Prior Publication Data

US 2005/0035747 A1 Feb. 17, 2005

(51) Int. Cl.⁷ .................................................. G05F 1/10
(52) U.S. Cl. ..................................... 323/222; 323/282
(58) Field of Search ................................. 323/285, 282, 323/222, 224, 299, 303, 283, 284, 259, 263; 363/124, 19, 23, 25, 26

(56) References Cited

U.S. PATENT DOCUMENTS

| | | | |
|---|---|---|---|
| 4,814,696 A | | 3/1989 | Kern et al. |
| 5,134,355 A | | 7/1992 | Hastings |
| 5,359,280 A | * | 10/1994 | Canter et al. ............... 323/282 |
| 5,406,470 A | | 4/1995 | Ridley et al. |
| 5,519,600 A | | 5/1996 | Ahladas |
| 5,838,181 A | | 11/1998 | Hesterman |
| 5,920,471 A | | 7/1999 | Rajagopalan et al. |
| 6,002,241 A | | 12/1999 | Jacobs et al. |
| 6,037,755 A | * | 3/2000 | Mao et al. ................... 323/222 |
| 6,788,033 B2 | * | 9/2004 | Vinciarelli ................... 323/225 |

OTHER PUBLICATIONS

"Analysis and design of a Wide Input Range Power Factor Correction Circuit for Three–Phase Applications" by Ray Ridley et al, 1993 IEEE 0–7803–0982–0/93, no date.
Linear Technology, LTC3440, Micropower synchronous Buck–Boost DC/DC Converter, Data Sheet, Copyright 2001, no date.
Abstract, "A High Efficiency, Non–Inverting Buck–Boost, DC–DC Converter", for publication at APEC 2004 conference, by Mark Gaboriault, Oct. 3, 2003, no date.

* cited by examiner

Primary Examiner—Rajnikant B. Patel
(74) Attorney, Agent, or Firm—Robert F. Hightower

(57) ABSTRACT

A power controller (10, 70) forms a pass-through zone of output voltages. When the output voltage is between an upper limit and lower limit of the pass-through zone, the power controller (10, 70) continuously connects the input voltage to the output to form the output voltage. When the output voltage is above the upper limit or below the lower limit of the pass-through zone, the power controller (10, 70) switches the output transistors (42, 58) to form the output voltage.

20 Claims, 4 Drawing Sheets

METHOD OF FORMING A HIGH EFFICIENCY POWER CONTROLLER

BACKGROUND OF THE INVENTION

The present invention relates, in general, to electronics, and more particularly, to methods of forming power conversion devices.

In the past, various methods and circuits were utilized to implement power conversion functions. One typical configuration, referred to as a buck converter, was used to regulate an output voltage that had a value that was less than an input voltage. The buck converter typically included a switching transistor that was controlled by a pulse width modulation controller or other similar controller. The switching transistor was enabled in a switching mode to supply power from the input voltage to the output as the output voltage decreased below a desired value. Another typical configuration, referred to as a boost converter, was used to regulate an output voltage that had a value that was greater than the input voltage. The boost converter also utilized a switching transistor that was operated in a switching mode to boost the value of the input voltage to the desired output voltage value. In some applications, a boost converter and a buck converter were connected together in series or in tandem to provide a more regulated output voltage than either the boost converter or buck converter could individually provide. The tandem coupled buck and boost converters operated the switching transistors similarly to the separate boost or buck converter. One problem with this tandem configuration was efficiency. With both converters processing power in the switching mode, the overall efficiency was the product of the two efficiencies, thus, the efficiency was lower than desired. The lower efficiency resulted in excess power dissipation and heat as well as increased operating costs.

Accordingly, it is desirable to have a power conversion method that has increased efficiency.

For simplicity and clarity of illustration, elements in the figures are not necessarily to scale, and the same reference numbers in different figures denote the same elements. Additionally, descriptions and details of well known steps and elements are omitted for simplicity of the description. As used herein current carrying electrode means an element of a device that carries current through the device such as a source or a drain of an MOS transistor or an emitter or a collector of a bipolar transistor, and a control electrode means an element of the device that controls current through the device such as a gate of an MOS transistor or a base of a bipolar transistor.

DETAILED DESCRIPTION OF THE DRAWINGS

Figure 1:
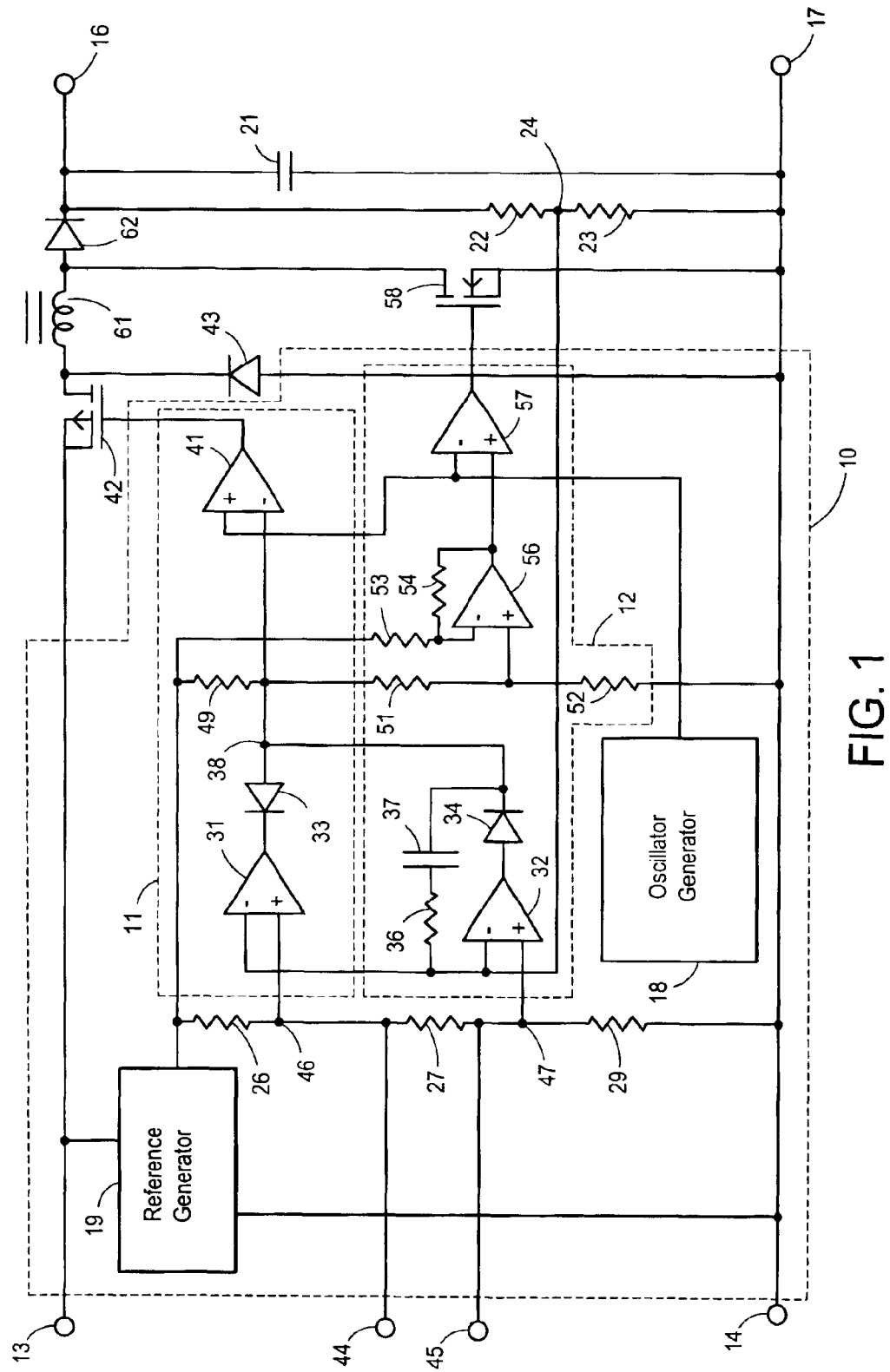
FIG. 1 schematically illustrates a portion of an embodiment of a high efficiency power controller in accordance with the present invention.

FIG. 1 schematically illustrates an embodiment of a portion of a power controller 10 that has a pass-through zone that facilitates high efficiency operation. Controller 10 includes a buck controller 11 and a boost controller 12 interconnected in tandem to provide an output voltage having a desired value. Controller 10 receives an input voltage between a voltage input 13 and a voltage return 14, and responsively generates an output voltage between a voltage output 16 and a voltage return 17. Return 17 typically is connected to return 14. Buck controller 11 and boost controller 12 are pointed out in general by dashed boxes. A kick-back diode 43 assists in operating buck controller 11, a boost diode 62 assists in operating boost controller 12, and an inductor 61 is shared by the operation of both controllers 11 and 12.

Buck controller 11 includes a first error amplifier 31, a buck comparator 41, and a buck output switch or output transistor 42. Boost controller 12 includes a second error amplifier 32, an adder-subtractor amplifier 56, a boost comparator 57, and a boost output switch or output transistor 58. A resistor 36 and a capacitor 37 form a compensation network that provides phase compensation to stabilize the feedback loop and minimize oscillation in the output voltage at output 16. Typically transistor 42 is a P-Channel power MOS transistor and transistor 58 is an N-Channel power MOS transistor but may also be other switch devices capable of supplying the desired current.

A feedback network includes resistors 22 and 23 connected in series between output 16 and return 17 to form a feedback voltage at a node 24 that is representative of the output voltage on output 16. The feedback network typically is external to controller 10, but may be within controller 10 in some embodiments. A reference generator 19 of controller 10 provides a reference voltage on an output of generator 19. Generator 19 can be one of various implementations that are well-known to those skilled of the art including a bandgap reference generator. A signal generator 18 is also included in controller 10. Generator 18 generates an oscillating signal that facilitates switching transistors 42 and 58 at a periodic rate. In the preferred embodiment, the oscillating signal from generator 18 has a sawtooth wave shape that varies between two voltages that are greater than the voltage on return 14. Such oscillating signals are well known to those skilled in the art. An output capacitor 21 functions to filter the output voltage from controller 10. Other well known functions and circuits such as soft start, under voltage lock-out, over voltage protection, current limit, thermal protection, current mode control, or voltage mode control may also be included as a portion of controller 10. Transistors 42 and 58, resistors 22 and 23, diodes 43 and 62, and capacitor 21 typically are external to controller 10 but any or all may be included within controller 10 in some embodiments.

Typically, the input voltage applied between input 13 and return 14 is a voltage that varies both above and below the desired value of the output voltage. The pass-through zone formed by controller 10 increases the operational efficiency while forming the output voltage from the varying input voltage. The pass-through zone is a range of output voltage values for which controller 10 continuously connects the input voltage to output 16 to generate the output voltage. In general, the pass-through zone has a first voltage or upper limit and a second voltage or lower limit. When the output voltage is no greater than the upper limit and no less than the lower limit, controller 10 continuously enables transistor 42 and disables transistor 58 in order to couple the input voltage to output 16 to keep the output voltage within the desired range. Thus, buck controller 11 and boost controller 12 are inhibited from operating in the switching mode. When the value of the output voltage is greater than the upper limit of the pass-through zone, boost controller 12 disables transistor 58 and buck controller 11 operates in the switching mode by driving transistor 42 with the oscillating signal to decrease the value of the output voltage. When the value of the output voltage is less than the lower limit of the pass-through zone, buck controller 11 continuously enables transistor 42 and boost controller 12 operates in the switching mode by driving transistor 58 with the oscillating signal to increase the value of the output voltage. Consequently, when the output voltage is greater than or less than the pass-through zone, controller 10 switchingly couples the input voltage to output 16. Those skilled in the art will realize that because of the high gain of the feedback circuit, the output voltage may only be a few microvolts greater than or less than the respective upper or lower limits of the pass-through zone. Typically the upper and lower limits are no greater than about ten percent (10%) above and below the desired value of the output voltage however the amount depends on the amount of regulation desired in the output voltage.

A reference divider network comprising resistors 26, 27, and 29 along with associated reference nodes 46 and 47 are connected in series between the output of generator 19 and return 14. The reference divider network provides two different reference voltage values that are used by amplifiers 31 and 32 to establish the upper and lower limits of the pass-through zone. The reference voltage at node 46 establishes the output voltage value representing the upper limit of the pass-through zone, and the reference voltage at node 47 establishes the output voltage value representing the lower limit of the pass-through zone. In some embodiments, resistor 27 may be omitted and an external resistor may be connected to optional inputs 44 and 45 to function for resistor 27. Such an external resistor provides a method to adjust the reference voltage values. In other embodiments, resistor 27 can remain and an external resistor connected to inputs 44 and 45 in parallel with resistor 27.

The output of amplifiers 31 and 32 are logically "OR" ed together, through diodes 33 and 34, to form a single control voltage at a control node 38. The control voltage is used to control the operation of both controllers 11 and 12 and transistors 42 and 58. In the pass-through zone operating mode, when the value of the feedback voltage is less than the voltage at node 46, the output of amplifier 31 is driven to a high level that reverse biases diode 33 and prevents amplifier 31 from driving node 38. Similarly, when the value of the feedback voltage is greater than the voltage at node 47, the output of amplifier 32 is driven to a low level that reverse biases diode 34 and prevents amplifier 32 from driving node 38. Thus, when amplifier 31 is high and amplifier 32 is low node 38 is not driven. Resistors 49, 51, and 52 form a resistor divider that sets the level of the control voltage that is applied to amplifier 56. Typically resistors 49, 51, and 52 are selected so that when neither amplifier 31 nor 32 is driving node 38, resistors 49, 51, and 52 provide a voltage at node 38 that is larger than the maximum value of the oscillating signal applied to comparator 41. This ensures that comparator 41 enables transistor 42 to couple the input voltage to output 16 and that comparator 57 disables transistor 58. Also under this condition of neither amplifier 31 nor 32 driving node 38, resistors 49, 51, 52, 53, and 54 are selected to provide a voltage at the output of amplifier 56 that is approximately equal to the control voltage at node 38 minus an offset that is larger than the peak-to-peak amplitude of oscillating signal. This condition ensures that the output of comparator 57 is low and transistor 58 is disabled.

In operation, when the output voltage on output 16 is within the past-through zone, the feedback voltage at node 24 is less than the reference voltage at node 46 and greater than the reference voltage at node 47. Thus, the output of amplifier 31 is a high voltage and the output of amplifier 32 is a low voltage and diodes 33 and 34 block amplifiers 31 and 32 from driving node 38. Since resistors 49, 51, and 52 form a voltage at node 38 that is larger than the maximum value of the oscillating signal, the output of comparator 41 is low and transistor 42 is enabled to connect the input voltage to output 16. Also, the output of amplifier 56 provides a voltage that drives the output of comparator 57 low to disable transistor 58.

If the value of the output voltage increases sufficiently to cause the value of the feedback voltage at node 24 to exceed the value of the reference voltage at node 46, the output of amplifier 31 will decrease causing a decrease in the control voltage at node 38. When the value of the control voltage decreases past the upper value of the oscillating signal, comparator 41 responsively generates pulses that switchingly drive transistor 42. The pulses occur whenever the control voltage at node 38 is less than the upper value of the oscillating signal from generator 18. The pulses from the output of comparator 41 switch transistor 42 thereby operating controller 10 in the buck mode and reducing the value of the output voltage. Controller 10 continues to operate in the buck mode as long as the value of the output voltage is greater than the upper limit of the pass-through zone.

If the output voltage decreases to a value that is less than the lower limit of the pass-through zone, the feedback voltage decreases to a value that is less than the reference voltage at node 47. Consequently, the output voltage of amplifier 32 increases and correspondingly increases the control voltage. The high control voltage causes the output of amplifier 56 to increase past the lower limit of the oscillating signal thereby enabling comparator 57 to generate pulses to switchingly drive transistor 58 and operate controller 10 in the boost mode. The pulses occur whenever the output of amplifier 56 is greater than the lower value of the oscillating signal from generator 18. As the value of the output voltage increases from the boost mode operation, the feedback voltage also increases causing a corresponding decrease in the output of amplifier 32 until the output voltage is no less than the lower limit of the pass-through zone. The output of amplifier 56 responsively decreases past the lower limit of the oscillating signal thereby forcing the output of comparator 57 low and disabling transistor 58.

In one example embodiment of controller 10, the desired output voltage was twenty-four volts (24 V) and the upper and lower limits of the pass-through zone were twenty-six volts (26 V) and twenty-two volts (22 V), respectively. Resistors 26, 27, and 29 were selected to provide reference voltages of 2.6 volts at node 46 and 2.2 volts at node 47. Resistors 22 and 23 were selected to provide a feedback voltage of 2.4 volts when the output voltage was twenty-four volts (24 V). The values of resistors 49, 51, 52, 53, and 54 were chosen so that adder-subtractor amplifier 56 subtracted 2.5 volts from the control voltage at node 38. The oscillating signal had upper and lower peak values of two volts (2.0 V) and one volt (1.0 V), respectively. Consequently the value of the control voltage would be 2.5 volts when amplifiers 31 and 32 were not driving node 38. The input voltage applied between input 13 and return 14 was a half wave rectified and filtered voltage that varied between about eighteen volts (18 V) and thirty volts (30 V). In this example embodiment, controller 10 operated with an efficiency that was approximately ten percent (10%) greater than prior art controllers.

In order to facilitate this functionality, a first terminal of resistor 26 is connected to the output of generator 19 and a second terminal is connected to both node 46 and to a first terminal of resistor 27. A second terminal of resistor 27 is connected to node 47 and to a first terminal of resistor 29. A second terminal of resistor 29 is connected to return 14. Resistor 22 has a first terminal connected to output 16 and a second terminal connected to both node 24 and to a first terminal of resistor 23 which has a second terminal connected to return 14. Amplifier 31 has a positive input connected to node 46, an inverting input connected to node 24, and an output connected to a cathode of diode 33. An anode of diode 33 is connected to node 38 and to a cathode of diode 34. An anode of diode 34 is connected to the output of amplifier 32. A positive input of amplifier 32 is connected to node 47 and an inverting input is connected to both node 24 and a first terminal of resistor 36. A second terminal of resistor 36 is connected to a first terminal of capacitor 37 which has a second terminal connected to the cathode of diode 34. Resistor 49 has a first terminal connected to the output of generator 19 and a second terminal connected to node 38 and to a first terminal of resistor 51. A second terminal of resistor 51 is connected to the positive input of amplifier 56 and to a first terminal of resistor 52 which has a second terminal connected to return 14. An inverting input of amplifier 56 is connected to a first terminal of resistor 54 and to a first terminal of resistor 53, and an output of amplifier 56 is connected to a second terminal of resistor 54. A second terminal of resistor 53 is connected to the output of generator 19. Generator 18 has an output connected to a negative input of comparator 57 and a positive input of comparator 41. Comparator 41 has a negative input connected to node 38 and an output connected to the gate of transistor 42. A source of transistor 42 is connected to input 13 and a drain is connected to both a cathode of diode 43 and a first terminal of inductor 61. An anode of diode 43 is connected to return 14. A second terminal of inductor 61 is connected to the anode of diode 62 and to the drain of transistor 58. A source of transistor 58 is connected to return 14 and a gate of transistor 58 is connected to the output of comparator 57. A positive input of comparator 57 is connected to the output of amplifier 56. A first terminal of capacitor 21 is connected to output 16 and to the cathode of diode 62, and a second terminal of capacitor 21 is connected to return 14.

Figure 2:
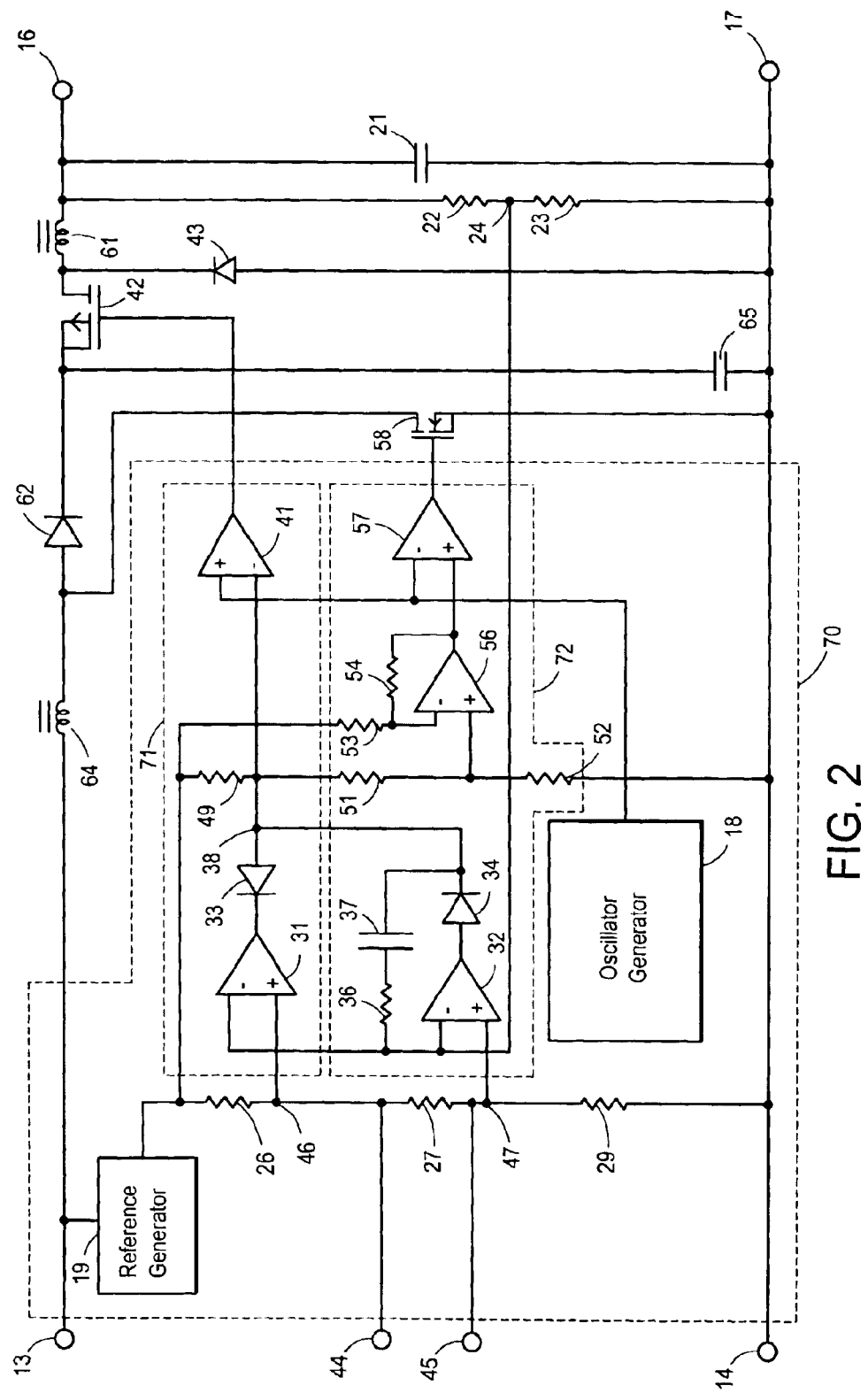
FIG. 2 schematically illustrates a portion of another embodiment of a high efficiency power controller in accordance with the present invention.

FIG. 2 schematically illustrates a portion of an embodiment of a power controller 70 that is an alternate embodiment of power controller 10 explained in the description of FIG. 1. Controller 70 couples a boost converter 72 before a buck converter 71. Boost converter 72 is followed in the tandem configuration with buck converter 71. This is the opposite arrangement to that of controller 10. Because of the different connections, the configuration of diodes 43 and 62, and inductor 61 are also different than those of controller 10. Inductor 61 and diode 43 are positioned between transistor 42 and output 16. An additional input inductor 64 is coupled in series with diode 62. A filter capacitor 65 is connected to receive the output voltage of boost converter 72 and store the energy for use by converter 71. In addition to high efficiency, converter 70 has minimal high-frequency ripple current at input 13, and converter 70 also provides capacitor 21 with a continuous output current resulting in less high-frequency ripple voltage at output 16. Transistors 42 and 58, diodes 43 and 62, resistors 22 and 23, inductors 61 and 64, and capacitors 21 and 65 typically are external to controller 70 but any or all may be included within controller 10 in other embodiments.

In order to facilitate this functionality, elements of controller 70 that control comparators 41 and 57 are connected in the same manner as the same elements of controller 10. However, transistors 42 and 58 are connected differently. The source of transistor 58 connected to return 14, the gate is connected to the output of comparator 57, and the drain is connected to a first terminal of inductor 64 and to an anode of diode 62. A second terminal of inductor 64 is connected to input 13. A cathode of diode 62 is connected to a first terminal of capacitor 65 and to a source of transistor 42. A drain of transistor 42 is connected to a cathode of diode 43 and to a first terminal of inductor 61, and the gate is connected to the output of comparator 41. A second terminal of inductor 61 is connected output 16. The anode of diode 43 and a second terminal of capacitor 65 are connected to return 14.

Figure 3:
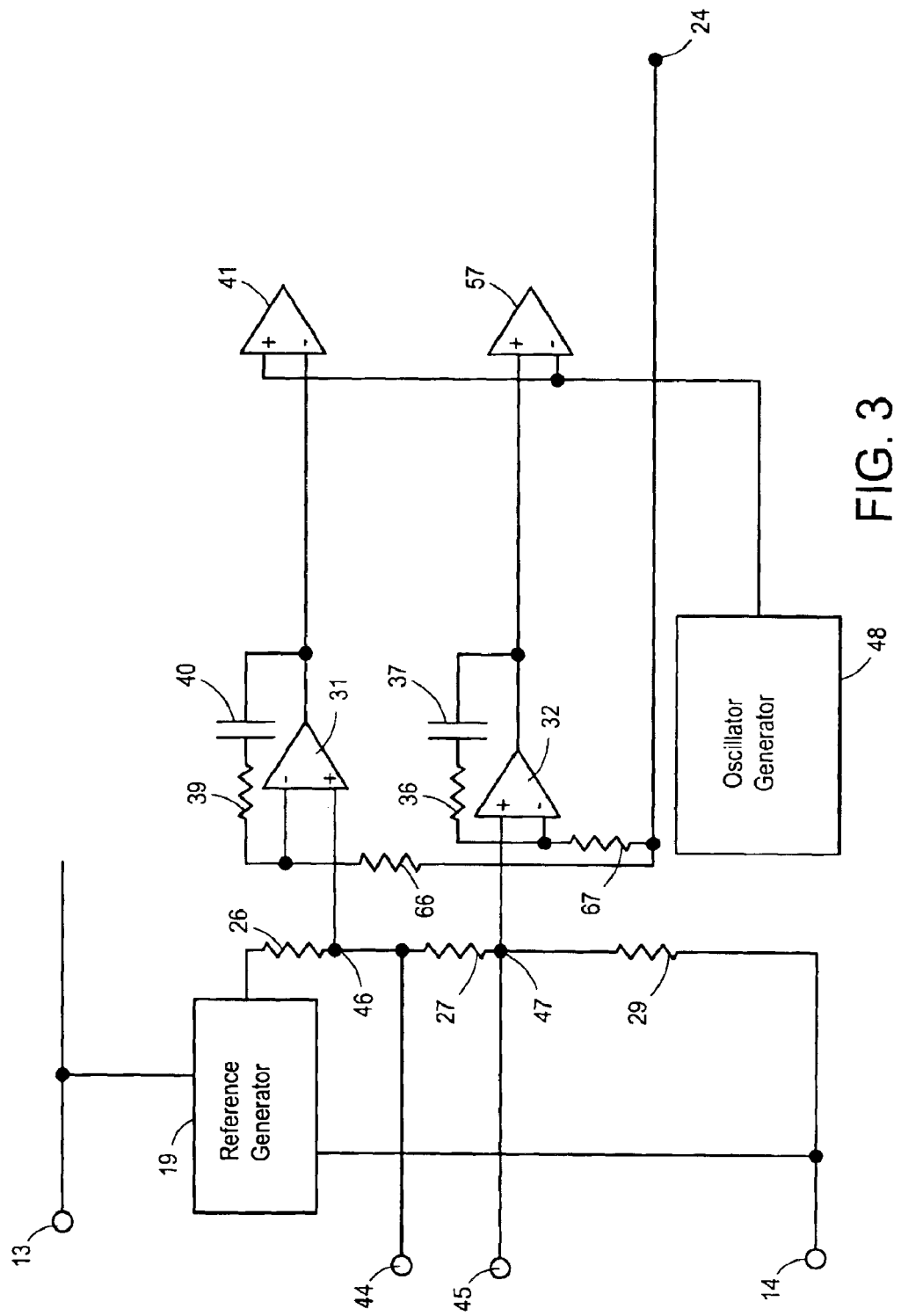
FIG. 3 schematically illustrates an alternate embodiment of a portion of the power controllers of FIG. 1 and FIG. 2 in accordance with the present invention.

FIG. 3 schematically illustrates an alternate embodiment of a portion of power controller 10 explained in the description of FIG. 1. In the alternate embodiment of FIG. 3, the outputs of amplifiers 31 and 32 are separated to form two control voltages instead of the single control voltage generated in the embodiment of FIG. 1. The output of amplifier 31 forms a first control voltage that drives comparator 41 directly to switchingly drive transistor 42 when the output voltage is greater than the upper limit of the pass-through zone. Similarly, the output of amplifier 32 forms a second control voltage that drives comparator 57 directly to switchingly drive transistor 58 when the output voltage is less than the lower limit of the pass-through zone. Consequently, diodes 33 and 34, resistors 49, 51, 52, 53, and 54, and amplifier 56 are omitted. A compensation network of a resistor 39 and a capacitor 40 may be coupled to amplifier 31 to improve the stability of controller 10 in a manner similar to resistor 36 and capacitor 37. Using separate compensation for the upper and lower limits of the pass-through zone improves the stability of the controller. Additionally, input resistors 66 and 67 couple the feedback voltage to the inputs of amplifiers 31 and 32. Resistors 66 and 67 assist in providing some isolation between the inputs to amplifiers 31 and 32.

To facilitate this operation, the output of amplifier 31 is connected to the inverting input of comparator 41 and to a first terminal of capacitor 40. A second terminal of capacitor 40 is connected to a first terminal of resistor 39 which has a second terminal connected to the inverting input of amplifier 31. The output of amplifier 32 is connected to the positive input of comparator 57.

Figure 4:
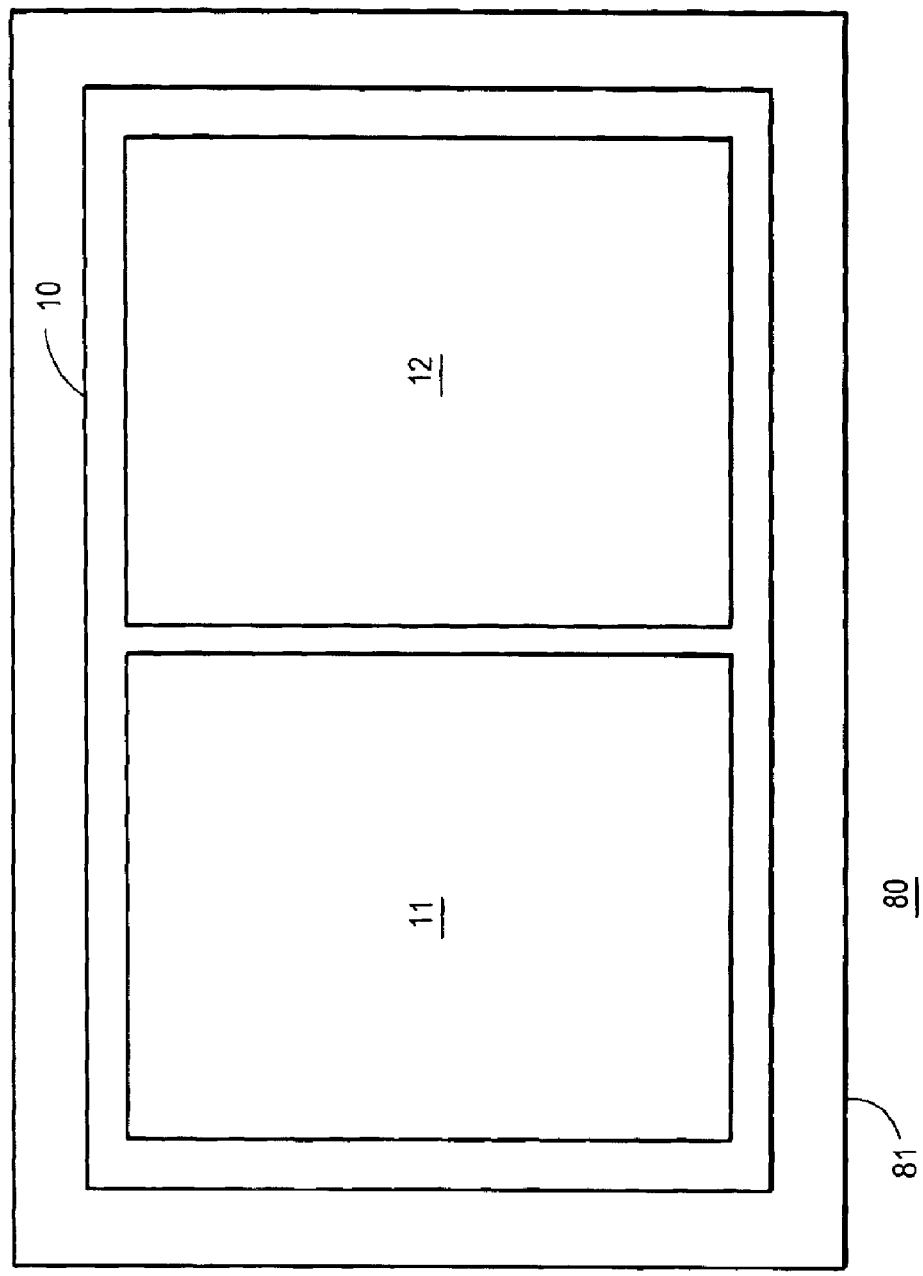
FIG. 4 illustrates an enlarged plan view of a semiconductor device that includes a high efficiency power controller in accordance with the present invention.

FIG. 4 illustrates an enlarged plan view of a semiconductor device 80 that includes high efficiency power controller 10 explained in the description of FIG. 1. Device 80 is formed on a semiconductor die 81.

In view of all of the above, it is evident that a novel device and method is disclosed. Forming the pass-through voltage zone facilitates coupling the input voltage to the output to form the output voltage in a controlled manner to increase the efficiency of the voltage conversion. Using an upper voltage limit and a lower voltage limit provides voltage levels to transition between continuously coupling the input voltage to the output and switching the output transistors to form the output voltage.

What is claimed is:

1. A method of forming a high efficiency power controller comprising:

providing a boost converter coupled in tandem with a buck converter to receive an input voltage and generate an output voltage on an output of the high efficiency power controller;

forming the high efficiency power controller to operate the buck converter in a switching mode when the output voltage is greater than a first value and to operate the boost converter in a switching mode when the output voltage is less than a second value wherein the first value is greater than the second value; and forming the high efficiency power controller to constantly couple the input voltage to the output and not operate the buck converter or the boost converter in a switching mode when the output voltage is less than the first value and greater then the second value.

2. The method of claim 1 wherein forming the high efficiency power controller to constantly couple the input voltage to the output includes forming the high efficiency power controller to constantly enable an output transistor of the buck converter and disable an output transistor of the boost converter.

3. The method of claim 2 wherein forming the high efficiency power controller to constantly enable the output transistor of the buck converter and disable the output transistor of the boost converter includes coupling a first amplifier to receive a feedback voltage representative of the output voltage and to receive a first reference voltage and responsively generate a control voltage and including using the control voltage to enable the output transistor of the buck converter, and coupling a second amplifier to receive the control voltage and using an output of the second amplifier to disable the output transistor of the boost converter.

4. The method of claim 1 wherein forming the high efficiency power controller to constantly couple the input voltage to the output and not operate the buck converter or the boost converter in a switching mode when the output voltage is less than the first value and greater than the second value includes forming the high efficiency power controller to generate a control voltage having a first voltage representative of the first value and a second voltage representative of the second value.

5. The method of claim 4 wherein forming the high efficiency power controller to generate the control voltage having the first voltage representative of the first value and the second voltage representative of the second value includes coupling a first amplifier to receive a feedback voltage representative of the output voltage and to receive a first reference voltage, and coupling a second amplifier to receive a second reference voltage and the control voltage.

6. The method of claim 5 further including coupling a first comparator to receive an output of the second amplifier and receive an oscillating signal and responsively drive an output transistor of the boost converter.

7. The method of claim 6 further including coupling a second comparator to receive the control voltage and receive the oscillating signal and responsively drive an output transistor of the buck converter.

8. The method of claim 7 further including coupling a third amplifier to receive the feedback voltage and to receive a third reference voltage, and coupling an output of the third amplifier to an output of the first amplifier.

9. The method of claim 4 further including coupling a first comparator to receive the control voltage and receive an oscillating voltage and responsively drive an output transistor of the buck converter.

10. A method of operating a high efficiency power controller comprising:

coupling a boost controller in tandem with a buck controller;

continuously coupling an input voltage to an output of the high efficiency power controller and not switchingly operating either the buck controller or the boost controller when an output voltage on the output is less than a first value and greater than a second value wherein the first value is greater than the second value.

11. The method of claim 10 further including switchingly coupling the input voltage to the output when the output voltage is greater than the first value or less than the second value.

12. The method of claim 11 wherein switchingly coupling the input voltage to the output when the output voltage is greater than the first value or less than the second value includes providing a boost converter coupled in tandem with a buck converter to receive the input voltage and generate the output voltage; and switching the buck converter when the output voltage is greater than the first value and switching the boost converter when the output voltage is less than the second value.

13. The method of claim 11 wherein continuously coupling the input voltage to the output of the high efficiency power controller and not switchingly operating either the buck controller or the boost controller when the output voltage on the output is no greater than the first value and no less than the second value wherein the first value is greater than the second value includes generating a control voltage having a first voltage representative of the first value and a second voltage representative of the second value and using the control voltage to control an output transistor of a buck converter and an output transistor of a boost converter.

14. The method of claim 13 wherein using the control voltage to control the output transistor of the buck converter and the output transistor of the boost converter includes enabling the output transistor of the buck converter and disabling the output transistor of the boost converter for continuously coupling the input voltage to the output.

15. The method of claim 13 wherein generating the control voltage having the first voltage representative of the first value and the second voltage representative of the second value includes generating a first reference voltage and a second reference voltage and using the first reference voltage and the second reference voltage to generate the control voltage.

16. The method of claim 15 wherein using the first reference voltage and the second reference voltage to generate the control voltage includes amplifying a difference between the first reference voltage and a feedback voltage and amplifying a difference between the second reference voltage and the feedback voltage.

17. The method of claim 10 wherein continuously coupling the input voltage to the output of the high efficiency power controller and not switchingly operating either the buck controller or the boost controller when the output voltage on the output is no greater than the first value and no less than the second value wherein the first value is greater than the second value includes providing a boost converter coupled in tandem with a buck converter to receive the input voltage and generate the output voltage on an output; and switching the buck converter when the output voltage is greater than the first value and switching the boost converter when the output voltage is less than the second value.

18. A high efficiency power controller comprising:

a first output transistor coupled in a buck configuration;

a second output transistor coupled in a boost configuration;

a first error amplifier coupled to receive a feedback voltage that is representative of an output voltage and responsively generate a control voltage;

a first comparator coupled to receive the control voltage and responsively switch the first output transistor when the control voltage is greater than a first value; and an adder-subtractor amplifier coupled to receive the control voltage and responsively switch the second output transistor when the control voltage is less than a second value, the high efficiency power controller configured to continuously couple an input voltage to the output voltage and inhibit switchingly operating both the buck controller and the boost controller when the output voltage is at least about ten per cent less than a desired value of the output voltage and the first value is at least about ten per cent greater than the desired value of the output voltage.

19. The high efficiency power controller of claim 18 further including a second error amplifier coupled to receive the feedback voltage and responsively generate the control voltage.

20. The high efficiency power controller of claim 18 wherein the adder-subtractor amplifier coupled to receive the control voltage and responsively switch the second output transistor includes a second comparator coupled to receive the control voltage and responsively switch the second output transistor.

* * * * *